US010893264B1

(12) United States Patent
Tinaphong et al.

(10) Patent No.: US 10,893,264 B1
(45) Date of Patent: Jan. 12, 2021

(54) TRAFFIC LIGHT-TYPE SIGNAL STRENGTH METER/INDICATOR LINKED TO AN ANTENNA AGC CIRCUIT

(71) Applicant: VOXX International Corporation, Hauppauge, NY (US)

(72) Inventors: Prapan Paul Tinaphong, Carmel, IN (US); Chung Hua Hung, Kaohsiung Hsien (TW)

(73) Assignee: VOXX International Corporation, Hauppauge, NY (US)

( * ) Notice: Subject to any disclaimer, the term of this patent is extended or adjusted under 35 U.S.C. 154(b) by 0 days.

(21) Appl. No.: 16/852,799

(22) Filed: Apr. 20, 2020

Related U.S. Application Data

(60) Provisional application No. 62/864,853, filed on Jun. 21, 2019.

(51) Int. Cl.
*H04N 17/00* (2006.01)
*H04N 17/04* (2006.01)
*G08B 5/36* (2006.01)

(52) U.S. Cl.
CPC ............. *H04N 17/045* (2013.01); *G08B 5/36* (2013.01); *H04N 17/004* (2013.01)

(58) Field of Classification Search
CPC ...... H04N 17/00; H04N 17/004; H04N 17/02; H04N 17/045; H04N 17/04; H04N 5/4401; H04N 5/44; H04N 5/4446; H04N 5/50; H04N 9/646; H04N 9/647; H04B 17/318;

(Continued)

(56) References Cited

U.S. PATENT DOCUMENTS

| 4,336,534 A | 6/1982 | Kumagai ......................... 345/39 |
| 4,935,746 A | 6/1990 | Wells ............................. 343/703 |
| 5,486,843 A | 1/1996 | Otting et al. .................... 345/35 |

(Continued)

OTHER PUBLICATIONS

King, "Low Profile Digital HDTV Over-the-Air Antenna Owner's Manual". Abstract and full text available at: https://kingconnect.com/content/Product%20Manuals/KING%20OTA%20Antennas/KING%20Jack%20w%20Mount%26Meter%20Manual%20%28OA8500%29.pdf (last accessed on May 29, 2020).

(Continued)

*Primary Examiner* — Sherrie Hsia
(74) *Attorney, Agent, or Firm* — Bodner & O'Rourke, LLP; Gerald T. Bodner; Christian P. Bodner

(57) ABSTRACT

A signal strength meter/indicator for use with an over-the-air broadcast television signal receiving antenna includes an input bandpass filter circuit, a first preamplifier circuit, a controllable variable attenuator circuit, a second preamplifier circuit, a splitter, an output bandpass filter circuit, a VHF/UHF filter circuit, a power detector circuit, a microcontroller and a display. The microcontroller, the controllable variable attenuator circuit, the second preamplifier circuit, the splitter, the VHF/UHF filter circuit and the power detector circuit together define an AGC circuit which adjustably controls the power level of an output signal provided to a television. The display is also adjustably controlled by the AGC circuit in displaying an indication of the relative signal strength of the broadcast television signal received by the signal receiving antenna to provide more accurate measurements and indication of the relative signal strength of the received broadcast television signal indicated on the display.

23 Claims, 9 Drawing Sheets

(58) Field of Classification Search
CPC ..... H04B 1/1027; H04B 1/109; H04L 1/0026; G08B 5/36
USPC ....... 348/180, 189, 193, 725, 707, 728, 678; 455/67.11, 67.13, 67.7, 134, 135, 150.1, 455/154.1, 155.1, 156.1–157.2, 159.1, 455/161.3, 226.1, 226.2, 226.4, 339–341
See application file for complete search history.

(56) References Cited

U.S. PATENT DOCUMENTS

| | | | |
|---|---|---|---|
| 5,760,739 A | 6/1998 | Pauli | 342/359 |
| 5,797,083 A | 8/1998 | Anderson | 455/25 |
| 5,903,237 A | 5/1999 | Crosby et al. | 342/359 |
| 5,923,288 A | 7/1999 | Pedlow, Jr. | 342/359 |
| 6,181,284 B1 | 1/2001 | Madsen et al. | 343/702 |
| 6,490,439 B1 | 12/2002 | Croft et al. | 455/90.1 |
| 6,522,870 B1 | 2/2003 | Tinaphong et al. | 455/234.1 |
| 6,661,373 B1 | 12/2003 | Holliday | 342/359 |
| 8,116,706 B1 * | 2/2012 | Clement | H04B 1/1027 455/179.1 |
| 8,269,672 B2 | 9/2012 | Tinaphong et al. | 343/700 MS |
| 8,526,935 B2 | 9/2013 | Besore et al. | 455/420 |
| 8,941,546 B2 | 1/2015 | King | 343/714 |
| 9,281,571 B2 | 3/2016 | Tinaphong et al. | |
| 9,531,067 B2 | 12/2016 | Huerta et al. | |
| 9,698,491 B2 | 7/2017 | Lee | |
| 9,787,339 B2 | 10/2017 | Shen et al. | |
| 9,847,584 B2 | 12/2017 | Lee | |
| 2017/0070250 A1 * | 3/2017 | Kundmann | H04B 1/16 |
| 2018/0034518 A1 | 2/2018 | Schulz et al. | |

OTHER PUBLICATIONS

Wave WiFi, Inc., "Rogue Wave". Abstract and full text available at: https://www.wavewifi.com/wp-content/uploads/2019/08/Rogue-Family-2016-Brochure.pdf (last accessed on May 29, 2020).

Zhejiang Longyou Xinxidi Electronics Co., Ltd., "*EM-900 HDTV Over-the-Air Antenna with Mount and Built-in Signal Meter*". Abstract and full text available at: https://www.alibaba.com/product-detail/EM-900-HDTV-Over-the-Air_60498141510.html (last accessed on May 29, 2020).

I.Force, "*Caravan Boat HD UHF/VHF/FM TV Antenna with Booster EM900*". Abstract and full text available at: https://www.crazysales.com.au/online-caravan-boat-hd-uhf-vhf-fm-tv-antenna-with-booster-em900-5665.html (last accessed on May 29, 2020).

Euromind, "*TV antenna outdoor reception EM 900 Eurostar compakt outdoor antenna with built in booster for VHF and UHF TV FM radioreception*". Abstract and full text available at: https://www.aliexpress.com/item/TV-antenna-outdoor-reception-EM-900-Eurostar-compakt-outdoor-antenna-with-built-in-booster-for-VHFand/32266515026.html (last accessed on May 29, 2020).

Ubiquiti Networks, "*Ubiquiti NanoBeam ac 16, Compact High-Performance airMAX Bridge 16dBi (NBE-5AC-16-US)*". Abstract and full text available at: https://www.amazon.com/dp/B019PDI6OY/ref=psdc_1194486_t1_B0713XMHH9 (last accessed on May 29, 2020).

EnGenius, "*EnGenius Technologies EnStationE-AC 5 GHz Outdoor 11ac Wave 2 Pt. Wireless Bridge*". Abstract and full text available at: https://www.amazon.com/dp/B073H5KSSJ/ref=sspa_dk_detail_3?psc=1&pd_rd_i=B073H5KSSJ&pd_rd_wg=fJE1u&pd_rd_r=7VH8336MK97GB2TJ6P1D&pd_rd_w=kUpj4 (last accessed on May 29, 2020).

Ubiquiti Networks, "*Ubiquiti NanoBeam ac Gen2 High-Performance airMAX ac Bridge (NBE-5AC-Gen2-US)*". Abstract and full text available at: https://www.amazon.com/dp/B0713XMHH9/ref=psdc_1194486_t2_B0055PKSCK (last accessed on May 29, 2020).

Ubiquiti Networks, "*Ubiquiti RP-5AC-GEN2-US 5 GHz Rocket AC Prism Gen2*". Abstract and full text available at: https://www.amazon.com/Ubiquiti-BaseStation-airPrism-Technology-RP-5AC-Gen2-US/dp/B072HN9RLT/ref=pd_sim_147_4?_encoding=UTF8&pd_rd_i=B072HN9RLT&pd_rd_r=7VH8336MK97GB2TJ6P1D&pd_rd_w=TFVIG&pd_rd_wg=fJE1u&psc=1&refRID=7VH8336MK97GB2TJ6P1D (last accessed on May 29, 2020).

Cambium Networks, "*Cambium Networks ePMP 5 GHz Force 190 Integrated High-Gain Antenna—Wireless Subscriber Module—Outdoor CPE—200 Mbps Bi-Directional Throughput (FCC) (C0589000082A)*". Abstract and full text available at: https://www.amazon.com/dp/B076M7R6C9/ref=sspa_dk_detail_4?psc=1&pd_rd_i=B076M7R6C9&pd_rd_wg=rcyxw&pd_rd_r=T0DBJWVT4ZVYHWNARBSF&pd_rd_w=q85eE (last accessed on May 29, 2020).

\* cited by examiner

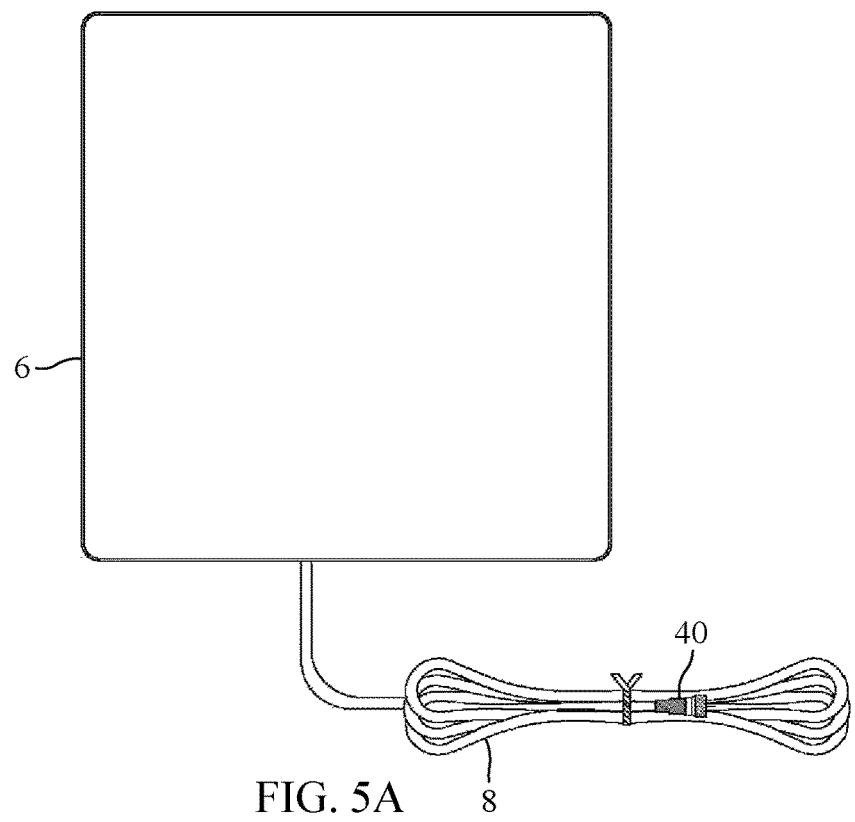
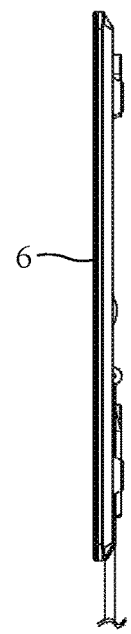
FIG. 5B
FIG. 5A
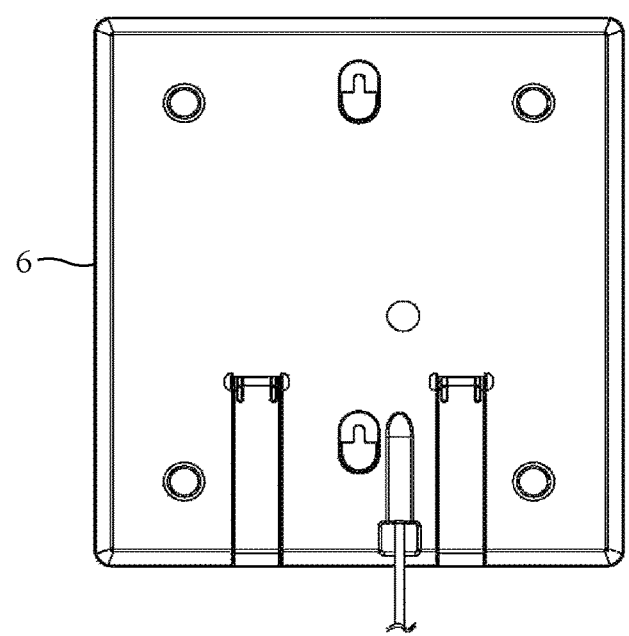
FIG. 5C

TRAFFIC LIGHT-TYPE SIGNAL STRENGTH METER/INDICATOR LINKED TO AN ANTENNA AGC CIRCUIT

CROSS-REFERENCE TO RELATED APPLICATIONS

This application is related to U.S. Provisional Patent Application Ser. No. 62/864,853, filed on Jun. 21, 2019, and entitled "Traffic Light-Type Signal Strength Meter/Indicator Linked to an Antenna AGC Circuit", the disclosure of which is hereby incorporated by reference and on which priority is hereby claimed.

BACKGROUND OF THE INVENTION

Field of the Invention

The present invention generally relates to television antennas, and more specifically relates to antennas for receiving over-the-air broadcast high definition television signals. Even more specifically, the present invention relates to signal strength meters for such television antennas.

Description of the Prior Art

Television antennas, especially indoor antennas used in residential premises by lay persons, whether the antennas be the older-type "rabbit ear" dipole antennas or the newer, planar, high definition television (HDTV) antennas, need to be positioned and tuned properly for best reception of over-the-air broadcast television signals. Some of the planar HDTV antennas include built-in or ancillary signal strength meters or displays, which help the consumer in positioning the antenna for best reception of television signals. Some of the signal strength meters have LED segmented displays, the segments lighting sequentially to indicate the degree of signal reception achieved by the antenna.

However, such displays may not be sufficiently intuitive to a lay person, such as a homeowner with no technical background, as to which proper position or adjustment of the antenna is achieved for the best reception of over-the-air broadcast television signals. Furthermore, a person's body has associated with it some impedance (i.e., inductance, capacitance and resistance) and may even act as a signal reception antenna itself. Thus, when a person holds the antenna to position it for the best signal reception, an inductive or capacitive coupling between the person's body and the antenna results especially when the person contacts the antenna with his hands. This capacitive or inductive coupling may even result from the person being in close proximity to the antenna without touching it. The nearness or contact of the antenna with the person's body may de-tune the antenna or render inaccurate the received signal strength determined by the signal strength meter as indicated on the display.

OBJECTS AND SUMMARY OF THE INVENTION

It is an object of the present invention to provide a signal strength measuring and indicating device for use with over-the-air broadcast television signal receiving antennas.

It is another object of the present invention to provide a signal strength meter/indicator for use with over-the-air broadcast television signal receiving antennas that helps compensate and adjust for the coupling effects of a person's body when the person is holding the antenna.

It is yet another object of the present invention to provide a signal strength meter/indicator for use with a high definition television (HDTV) antenna which may be embodied as a standalone device or incorporated in antenna as a component thereof.

It is still another object of the present invention to provide a signal strength measuring and indicating device, which includes an easy-to-read and comprehend indicator of received signal strength.

It is yet a further object of the present invention to provide a signal strength meter/indicator which overcomes the inherent disadvantages of known signal strength meters and/or displays.

In one form of the present invention, a device that measures and provides a simplified indication of the strength of over-the-air broadcast television signals received by an antenna is preferably in the form of a stand-alone component that is electronically coupleable to an antenna, although it is envisioned to be within the scope of the present invention to integrate the signal strength measuring/indicating device within or on the housing of the antenna. The signal strength device is coupled to, or forms part of, the AGC (Automatic Gain Control) circuit of the antenna's amplifier circuit. In this way, the AGC circuit will automatically compensate for the coupling effects that a person's body has on the antenna when the person is holding, or is in close proximity to, the antenna, especially when the person is trying to position the antenna in a location within his residence that provides the best signal reception.

The signal strength measuring and indicating device, in one form of the present invention, includes a bandpass filter circuit, that receives the RF (radio frequency) signal outputted by the antenna, a first preamplifier circuit electronically coupled to the output of the bandpass filter circuit, an attenuator circuit, which is preferably a controllable PIN diode attenuator circuit, that is coupled to the output of the first preamplifier circuit, a second preamplifier circuit, which is electronically coupled to the output of the attenuator circuit and a splitter or directional coupler, whose input is electronically coupled to the output of the second preamplifier circuit. The splitter has a first output, which is coupleable by a cable to a television, and a second output, which is electronically coupled to a VHF/UHF (very high frequency/ultra high frequency) filter circuit, also forming part of the device of the present invention for measuring and indicating the signal strength of signals received by the antenna connected to it.

A power detector circuit is also included in the device. The power detector circuit is electronically coupled to the output of the VHF/UHF filter circuit. The device further includes a microcontroller. The microcontroller receives an output signal from the power detector circuit and operates in conjunction with the controllable attenuator circuit as an AGC (Automatic Gain Control) circuit. Furthermore, the AGC microcontroller is electronically coupled to an LED segmented or discrete LED display to control the illumination of the LEDs thereof. The LEDs thus form an AGC-controlled indicator of received antenna signal strength.

Furthermore, the LEDs are chosen to define a traffic light-type display, with a red LED indicating poor signal strength, a yellow LED indicating moderate but perhaps acceptable signal strength, and a green LED indicating excellent signal strength.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 5A is a front elevational view of a planar HDTV signal receiving antenna with which the device of the present invention is preferably used.

FIG. 5B is a side elevational view of the planar HDTV antenna shown in FIG. 5A.

FIG. 5C is a rear elevational view of the planar HDTV antenna shown in FIGS. 5A and 5B.

DETAILED DESCRIPTION OF THE PREFERRED EMBODIMENTS

Figure 1:
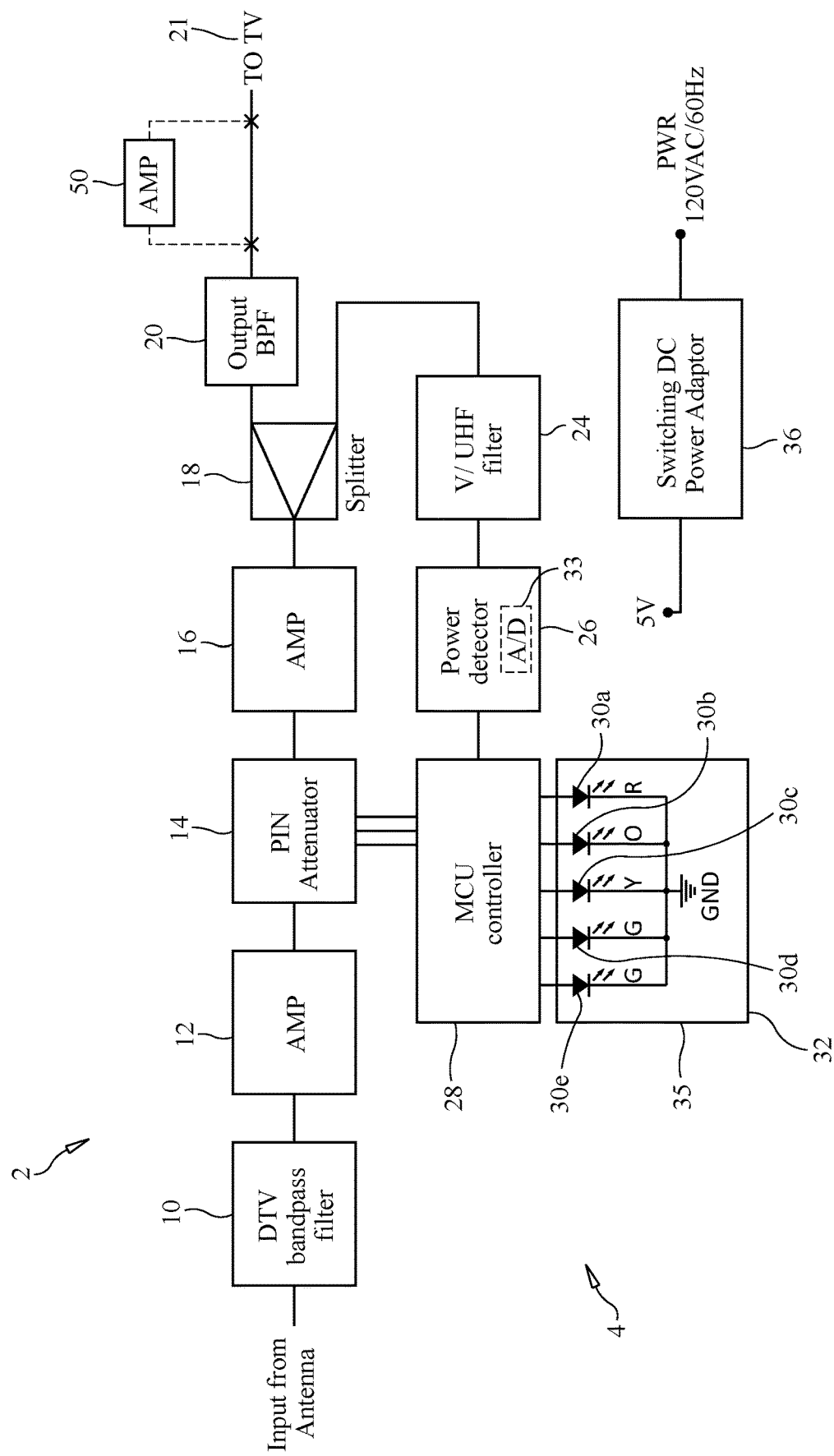
FIG. 1 is a block diagram of the electronic circuit of an AGC-controlled device for measuring and indicating the strength of a signal received by an over-the-air broadcast television signal receiving antenna, and having a traffic light-type signal strength display.

Reference should initially be had to FIG. 1 of the drawings, which shows in block diagram form the electronic circuitry 2 of the device 4 of the present invention for measuring and indicating the strength of signals received by an over-the-air broadcast television antenna 6. The signal strength meter/indicator 4 of the present invention is connected by a cable 8 to an antenna 6, such as that shown in FIGS. 5A-5C of the drawings. The antenna 6 is preferably a high definition television (HDTV) planar antenna, such as those disclosed in U.S. Pat. No. 8,269,672, which issued to Prapan Paul Tinaphong, et al., and U.S. Pat. No. 9,281,571, which also issued to Prapan Paul Tinaphong, et al., the disclosure of each of which is incorporated herein by reference. The antennas described in these patents work well to receive broadcast high definition television (HDTV) signals in residential premises, apartment buildings and offices.

The RF (radio frequency) signal from the antenna 6 is provided on the cable 8 to the input of a digital television (DTV) bandpass filter circuit, which filter circuit 10 preferably includes an FM (frequency modulated) trap and LTE (Long Term Evolution) band rejection. The DTV bandpass filter circuit 10 generates a filtered output signal on its output, which is provided to the input of a first preamplifier circuit 12. The first preamplifier circuit 12 generates an amplified, filtered RF output signal on its output, which is provided to the input of a controllable variable attenuator circuit 14. The attenuator circuit 14 is preferably a PIN diode attenuator having one or more control signal inputs which, in response to the control signals it receives, adjustably attenuates the amplified RF signal which it receives from the first preamplifier circuit 12. The attenuator circuit 14 generates an adjustably attenuated output signal on its output, which attenuated output signal is provided to the input of a second preamplifier circuit 16. The second preamplifier circuit 16 amplifies the attenuated RF signal from the attenuator circuit 14, and generates an amplified output signal on its output.

The amplified output signal from the second preamplifier circuit 16 is provided to the input of a splitter 18 or directional coupler. The splitter 18 has preferably a first output and a second output and splits the amplified signal from the second preamplifier circuit 16 between its first output and its second output. More specifically, the splitter 18 generates a first output signal on its first output, which is provided to the input of an output bandpass filter circuit 20. The bandpass filter circuit 20 generates a filtered output signal on its output, which is provided to the input of a television or monitor 21 using a coaxial cable 22 or the like connected between the output of the bandpass filter circuit 20 and the input of the television 21. Alternatively, an output amplifier 50, preferably providing about +10 dB amplification, may be inserted between the output bandpass filter circuit 20 and the television 21 to boost the strength of the split received signal provided to the television. More specifically, the input of the output "boost" amplifier 50 is connected to the output of the output bandpass filter 20, and the output of the amplifier 50 is connected to an output coaxial connector 52 (see FIG. 5F) or to the coaxial cable 22 for connection to the television 21.

The splitter 18 also provides a second output signal on its second output, which is provided to the input of a VHF/UHF (very high frequency/ultra high frequency) filter circuit 24. The VHF/UHF filter circuit 24 generates a filtered output signal on its output, which is provided to the input of a power detector circuit 26. The purpose of the power detector circuit 26 is to convert the analog RF signal it receives on its input to a digital signal representative of the power or other parameter (e.g., voltage) of the RF signal using an analog-to-digital converter circuit forming part of the power detector circuit 26. This digital signal correlates to the attenuated RF signal electrically upstream of the splitter 18, and is indicative of the strength of the signal received by the antenna 6. The power detector circuit 26 generates a digital output signal on its output, which is provided to the input of a microprocessor or microcontroller 28, such as a microcontroller unit (MCU). The microcontroller 28 is preferably Part No. MG82FG5D16, which is an 8051 based, full static, CMOS controller manufactured by Megawin Technology (Shenzhen) Co., Ltd. of Shenzhen, China, this particular microcontroller 28 being shown in the schematic diagram of FIGS. 2A, 2B and 2C of the drawings.

The microcontroller 28 generates control signals, as mentioned previously, in response to the output signal generated by the power detector circuit 26 and received by the microcontroller 28. These control signals are provided to the PIN attenuator circuit 14 to adjustably control the amplified RF signal provided to the PIN attenuator circuit 14 by the first preamplifier circuit 12. The microcontroller 28, with the PIN attenuator circuit 14, the second preamplifier circuit 16, the splitter 18, the VHF/UHF filter circuit 24 and the power detector circuit 26 together define an AGC (Automatic Gain Control) circuit which is used to adjustably control the power level of the RF signal provided to the television or monitor and received by the antenna 6 to which the signal strength meter/indicator 4 of the present invention is connected.

The microcontroller 28 also generates output signals on preferably five outputs thereof, which output signals are provided to individual LEDs (light emitting diodes) 30a-30e of an LED array display 32. The LED array display 32 may be a segmented display with the LED segments arranged to be adjacent and coplanar to one another, or they may be discreet LEDs 30a-30e mounted in a row on the housing 34 of the signal strength meter/indicator 4 of the present invention, as may be seen in FIG. 5D of the drawings. The individual LEDs 30a-30e of the LED array display 32 illuminate in accordance with the input signal strength detected by the signal strength meter/indicator 4 of the present invention.

Because the illumination of the individual LEDs 30a-30e is controlled by the microcontroller 28, which forms part of the AGC circuit of the signal strength meter/indicator 4 of the present invention, the LEDs 30a-30e, when illuminated, will more accurately indicate the received antenna signal strength, even though the antenna 14 may be held by a person when the person is determining a desired location to position the antenna 14, or when the person is in close proximity to the antenna 14. As mentioned previously, the person's body may act as an antenna itself, and may be capacitively or inductively coupled to the signal receiving antenna 14 and may de-tune the antenna 14 or affect the signal strength of the signals received by the antenna 14. Thus, the LEDs 30a-30e of the LED array display 32 form an AGC-controlled indicator of received antenna signal strength.

Even more preferably, each LED 30a-30e of the LED array display 32 is color-coded to effect a traffic light-type display. More specifically, the LED array display 32 may consist of three LEDs, one being a red LED 30a to indicate poor signal strength, a second being a yellow or orange LED 30c to indicate moderate but perhaps acceptable signal strength, and a third being a green LED 30e to indicate excellent signal strength. In the preferred form of the invention, there are five LEDs 30a-30e forming part of the LED array display 32. More specifically, there is a first LED 30a which illuminates in red to indicate poor signal strength, a second LED 30b illuminating in orange to indicate better received signal strength, a third LED 30c illuminating in yellow to indicate moderate but perhaps acceptable signal strength, a fourth LED 30d illuminating in green to indicate good signal strength, and a fifth LED 30e illuminating also in green to indicate excellent signal strength. The illumination of each of the five LEDs 30a-30e is controlled by output signals generated by the microcontroller 28 of the device 4 of the present invention.

Figure 5D:
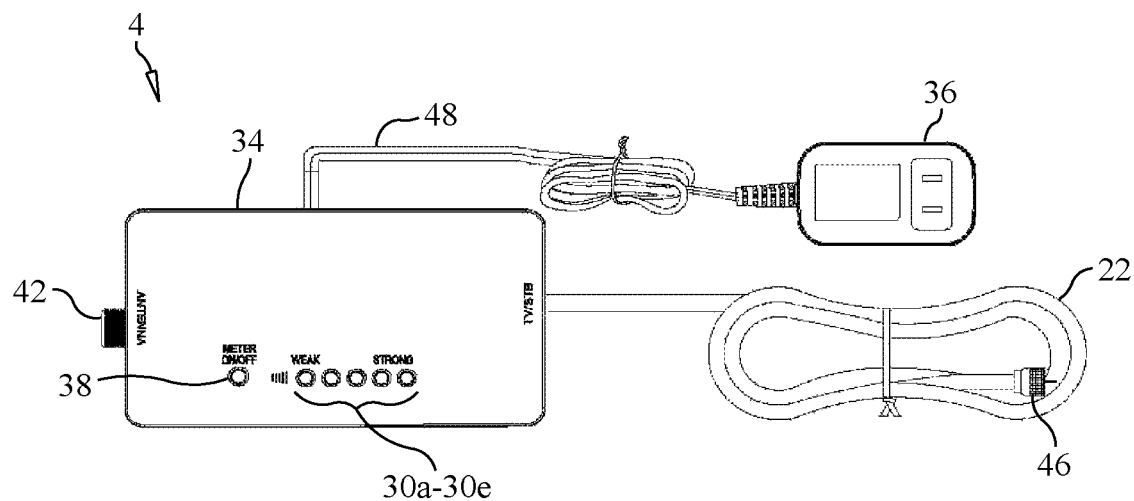
FIG. 5D is a front elevational view of the AGC-controlled device for measuring and indicating the strength of a signal received by an over-the-air broadcast television signal receiving antenna, such as the planar HDTV antenna shown in FIGS. 5A-5C, and formed in accordance with the present invention, and illustrating the preferred form of a traffic light-type display of the device for indicating the received signal strength of an antenna to which the device is connected.

The signal strength meter/indicator 4 of the present invention further includes a plug-in power adaptor 36 which is shown in FIGS. 1 and 5D of the drawings. The power adaptor 36 is preferably a switching AC/DC adaptor which converts 120 volts AC (alternating current) to five volts DC (direct current), the five volts DC being provided to the various components and circuits of the AGC-controlled signal strength meter/indicator 4 of the present invention. The power adaptor 36 may be conveniently plugged into a power receptacle or outlet of the premises in which the antenna 6 and signal strength meter/indicator 4 of the present invention are used.

Figure 2A:
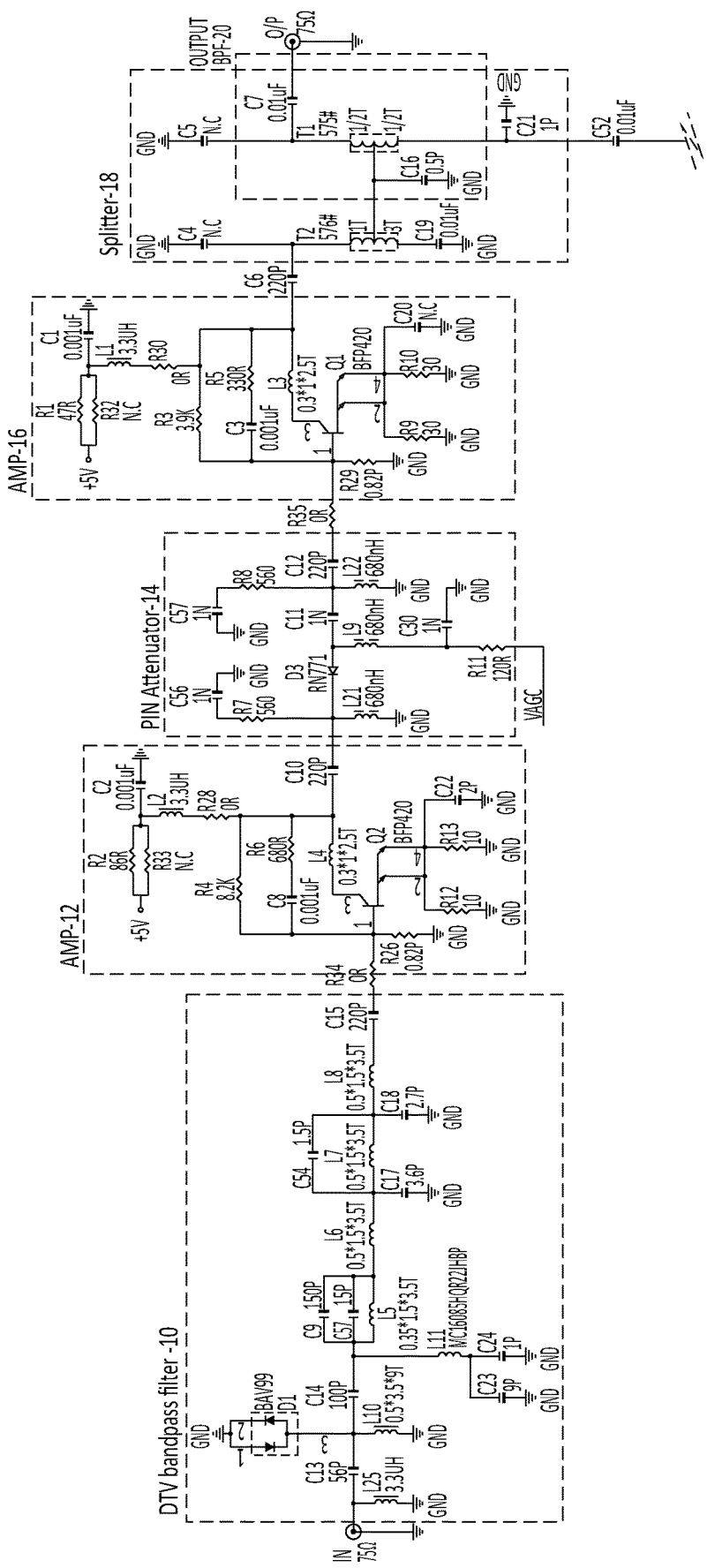
FIGS. 2A, 2B and 2C are portions of a schematic diagram of the AGC-controlled device of the present invention shown in FIG. 1.
Figure 2B:
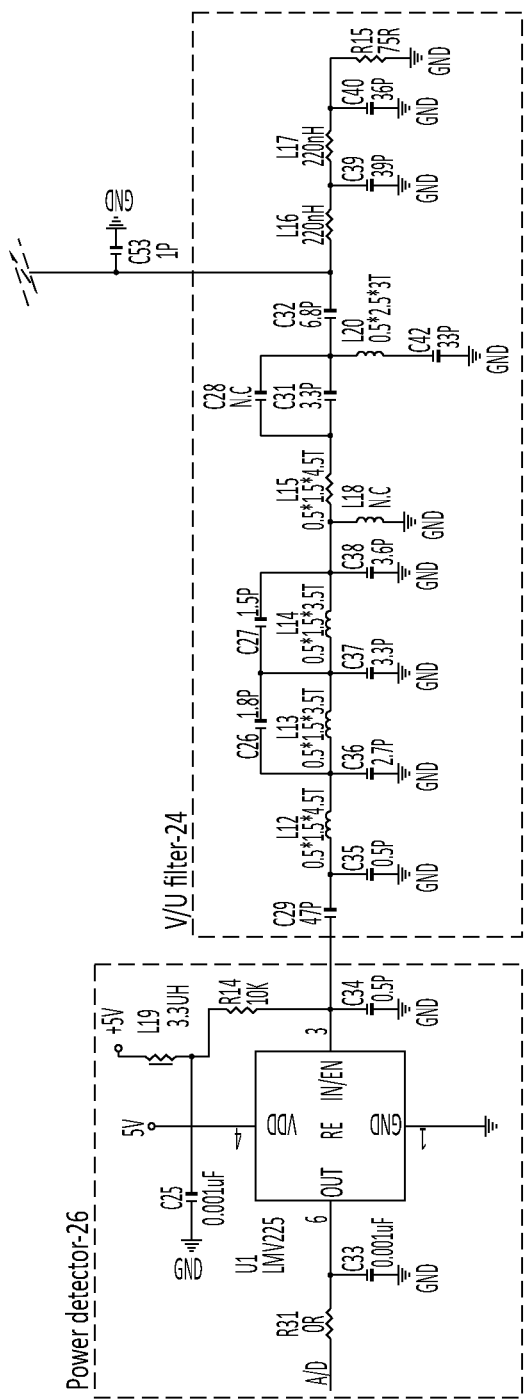
Figure 2C:
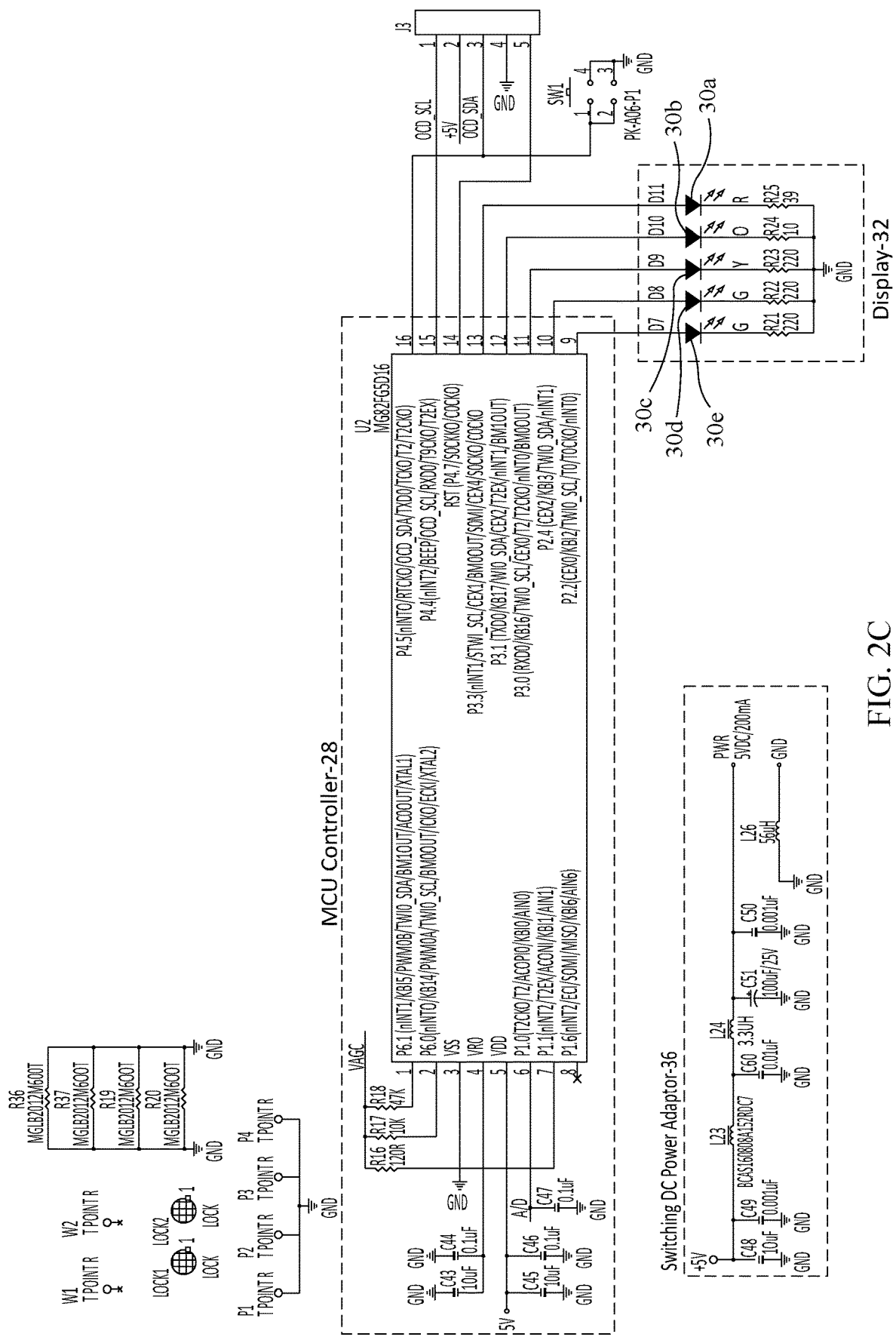

FIGS. 2A, 2B and 2C are portions of a schematic diagram of a preferred electronic circuit of the signal strength meter/indicator 4 of the present invention. Each of the components of the signal strength meter/indicator 4 that is shown in block diagram form in FIG. 1 is also illustrated in the circuit diagram of FIGS. 2A, 2B and 2C.

Figure 3:
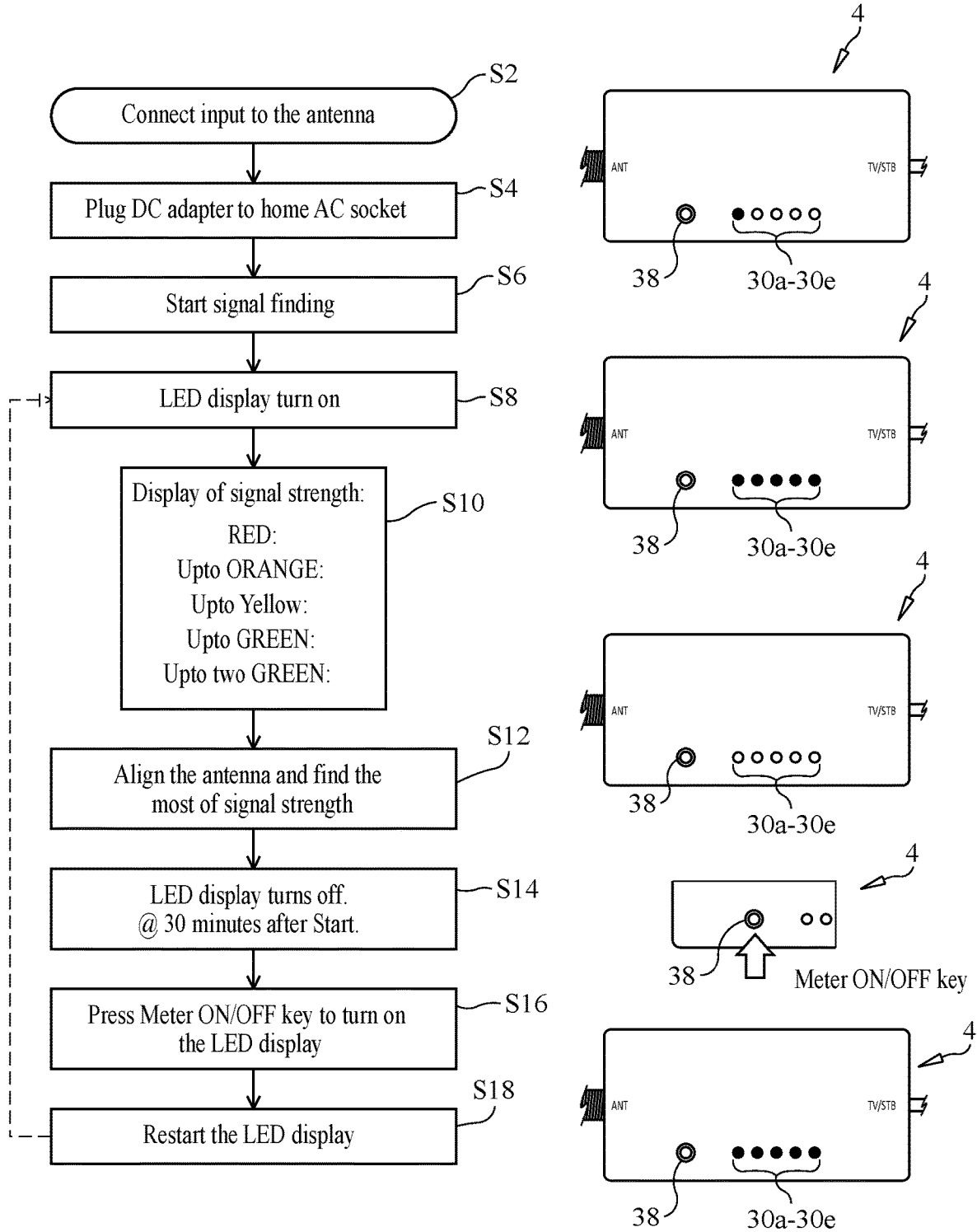
FIG. 3 is an operational flow chart with pictorial illustrations of the device of the present invention shown in FIGS. 1, 2A, 2B and 2C.

FIG. 3 of the drawings is a flow chart of the operational procedure when a person is using the signal strength meter/indicator 4 of the present invention. FIG. 3 also illustrates pictorially the signal strength meter/indicator 4 and the illumination of certain LEDs 30a-30e of the LED array display 32 thereof.

First, the user of the signal strength meter/indicator device 4 of the present invention should connect the input of the device 4 to the output of the antenna 6 (Step S2). Then, or before Step S2, the user of the device 4 of the present invention should plug the DC power adaptor 36 into an AC power socket or receptacle in the user's premises (Step S4). The device 4 will begin measuring the strength of the signal received by the antenna 6 to which it is connected, and the user may press the meter on/off push button switch 38 mounted on the housing 34 of the signal strength meter/indicator 4 to turn on the LED display 32 (Step S6). The LED display 34 of the signal strength meter/indicator 4 will then turn on (Step S8), and will display the received signal strength where, as mentioned previously, the red LED 30a, when illuminated, indicates poor signal strength, the orange LED 30b, when illuminated, indicates better signal strength, the yellow LED 30c, when illuminated, indicates moderate but perhaps acceptable or adequate signal strength, the first green LED 30d, when illuminated, indicates good signal strength, and when both the second green LED 30e and the first green LED 30d illuminate, this indicates excellent signal strength (Step S10).

Now, the user moves the antenna 6 connected to the signal strength meter/indicator 4 to different locations, orientations or positions within his premises to find the best signal strength of signals received by the antenna 6, guided by the illumination of the LEDs 30a-30e of the display 32 (Step S12). The LED display 32 will shut off automatically after about 30 minutes from the time, in Step S6, that the LED display 32 is initially energized (Step S14). If necessary to restart the meter after this predetermined period of time has elapsed, the user may press the meter on/off push button switch 38 on the housing 34 again to turn on the LED display 32 (Step S16), and the LED display 32 will restart (Step S18). The operation routine then returns to Step S8, where the display 32 turns on.

Figure 4A:
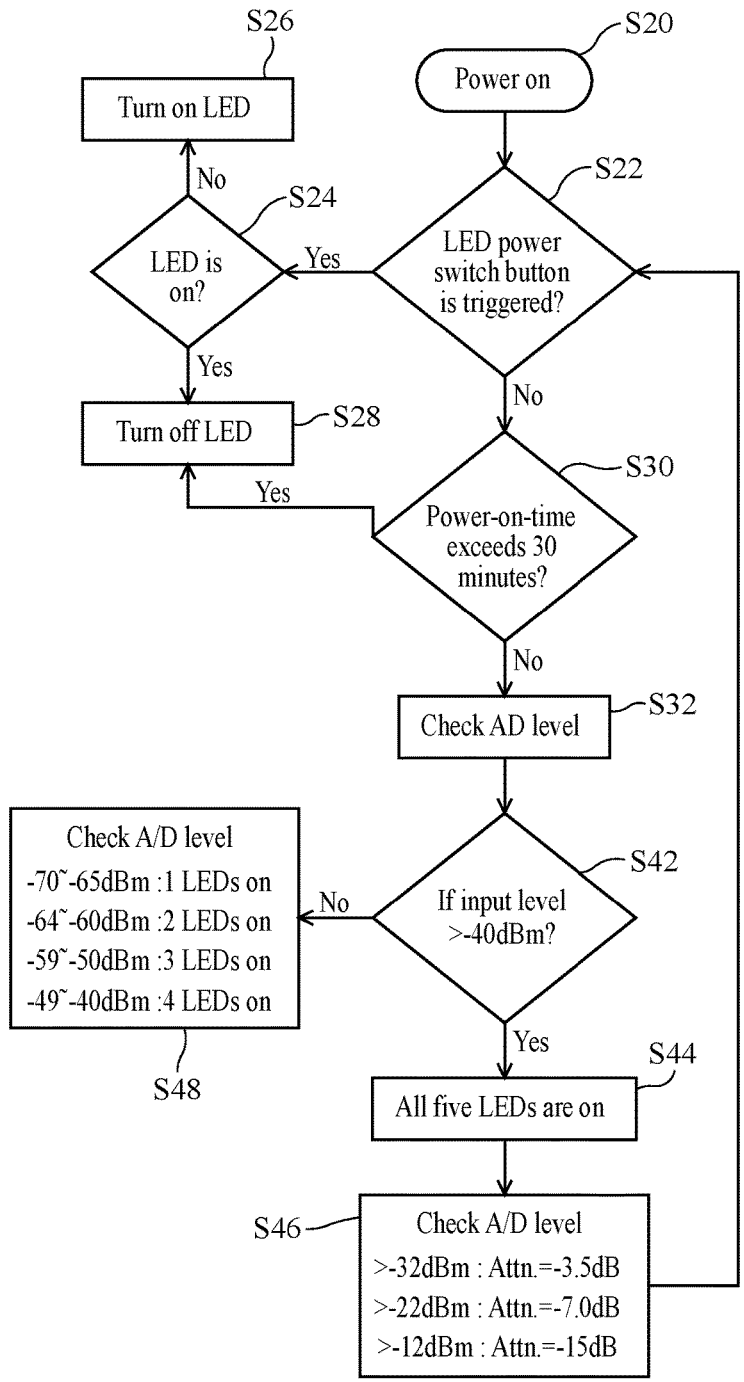
FIG. 4A is a flow chart of the software operation of the device of the present invention shown in FIGS. 1, 2A, 2B, 2C and 3.
Figure 4B:
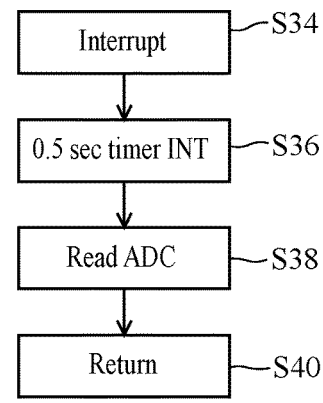
FIG. 4B is a flow chart of a subroutine of the software operation of the device shown in FIG. 4A.

FIGS. 4A and 4B together illustrate a flow chart of the software operation of the electronic circuit 2 of the signal strength meter/indicator 4 of the present invention. First, when the user presses the meter on/off push button switch 38 momentarily, a "power on" signal is provided to the microcontroller 28 (Step S20). The microcontroller 28 determines whether the LED display power on/off push button switch 38 is pressed (Step S22). If the switch 38 has been pressed, then the microcontroller 28 determines whether the LED display 32 is on (Step S24). If the LED display 32 is not on, then the microcontroller 28 turns on the LED display 32 (Step S26). However, if the LED 32 display is already on, then the microcontroller 28 causes the LED display 32 to turn off (Step S28).

If the microcontroller 28, in Step S22, determines that the LED display power on/off push button switch 38 was not triggered, then the microcontroller 28 determines whether the time in which the LED display 32 is energized exceeds 30 minutes (Step S30). If it is determined that the power-on time of the LED display 32 does not exceed 30 minutes in Step S30, then the microcontroller 28 will check the signal power level represented by the digital output signal generated by the power detector circuit 26 (Step S32). This subroutine of checking the power level is shown in FIG. 4B of the drawings.

More specifically, the power detector circuit 26 of the signal strength meter/indicator 4 of the present invention includes an analog-to-digital converter circuit, as mentioned previously. The power of the RF signal split by the splitter 18, filtered by the VHF/UHF filter circuit 24 and provided to the input of the power detector circuit 26, is converted to a digital signal by an internal analog-to-digital converter circuit within the power detector circuit 26. The digital signal, which corresponds to the power level (or voltage) of the RF signal, is provided to the microcontroller 28.

In the subroutine of the software operation of the electronic circuit 2 of the signal strength meter/indicator 4, as shown in FIG. 4B, the microcontroller 28 will interrupt the operational flow of the circuit 2 (Step S34) and set an "interrupt" timer of the microcontroller 28 for 0.5 seconds (Step S36). The microcontroller 28 will read the digital output signal of the analog-to-digital converter circuit within the power detector circuit 26 (Step S38), and then will return to the normal flow of operation of the electronic circuit 2 shown in FIG. 4A (Step S40).

If the microcontroller 28 determines that the input level of the received signal is greater than −40 dBm (Step S42), the microcontroller 28 will illuminate all five LEDs 30a-30e on the display 32 (Step S44). The microcontroller 28 will then check the signal level represented by the digital signal of the analog-to-digital converter circuit in the power detector circuit 26 to determine what adjustments should be made to the PIN attenuator circuit 14 forming part of the AGC circuit. More specifically, if the level of the digital signal outputted by the analog-to-digital converter circuit corresponds to a signal strength level received by the antenna 6 of greater than −32 dBm, then the microcontroller 28 will set the PIN attenuator circuit 14 to provide an attenuation equal to −3.5 dB (Step S46). If the level of the digital signal outputted by the analog-to-digital converter circuit corresponds to a signal strength level received by the antenna 6 of greater than −22 dBm, then the microcontroller 28 will set the PIN attenuator circuit 14 to provide an attenuation equal to −7.0 dB (Step S46). If the level of the digital signal outputted by the analog-to-digital converter circuit corresponds to a signal strength level received by the antenna 6 of greater than −12 dBm, then the microcontroller 28 will set the PIN attenuator circuit 14 to provide an attenuation equal to −15 dBm (Step S46). The microcontroller 28 then returns to the decision block of Step S22 to determine if the LED display power on/off push button switch 38 has been triggered.

If, however, the microcontroller 28 determines that the input level of the received signal is not greater than −40 dBm in Step S42, then the microcontroller 28 will check the level of the output signal of the analog-to-digital converter circuit of the power detector circuit 26 to determine which LEDs 30a-30e of the LED display 32 should be illuminated (Step S48). If it is determined that the signal received by the antenna 6 is between about −70 dBm and about −65 dBm, then the microcontroller 28 will illuminate the red LED 30a (Step S48). If it is determined that the signal received by the antenna 6 is between about −64 dBm and about −60 dBm, then the microcontroller 28 will illuminate the red and orange LEDs 30a, 30b (Step S48). If it is determined that the signal received by the antenna 6 is between about −59 dBm and about −50 dBm, then the microcontroller 28 will illuminate three LEDs, that is, the red LED 30a, the orange LED 30b and the yellow LED 30c (Step S48). If it is determined that the signal received by the antenna 6 is between about −49 dBm and about −40 dBm, then the microcontroller 28 will illuminate four LEDs, that is, the red LED 30a, the orange LED 30b, the yellow LED 30c and the first green LED 30d (Step S48).

Reference should now be had to FIGS. 5A-5F of the drawings. As mentioned previously, FIGS. 5A-5C show a planar HDTV antenna 6 which is preferably used with the AGC-controlled signal strength meter/indicator device 4 of the present invention. The planar antenna 6 includes a coaxial cable 8 emanating therefrom, the female connector 40 on the free end of the cable 8 being coupleable to the male coaxial input connector 42 of the signal strength meter/indicator device 4 of the present invention.

Figure 5E:
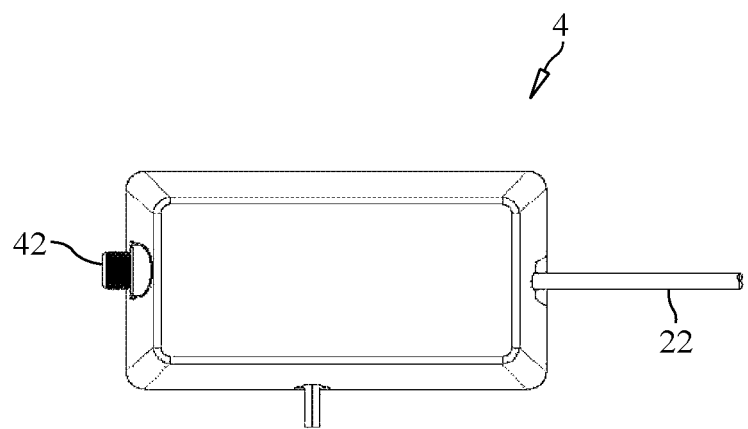
FIG. 5E is a rear elevational view of the device of the present invention shown in FIG. 5D.

The signal strength meter/indicator 4 of the present invention is shown in FIGS. 5D and 5E of the drawings. The outer housing 34 of the signal strength meter/indicator 4 has mounted on the top or front surface thereof a meter on/off push button switch 38 which may be pressed by the user, as well as a row of five LEDs 30a-30e forming an AGC-controlled display 32. The LEDs are arranged in the following colored order: a red LED 30a, an orange LED 30b, a yellow LED 30c, a first green LED 30d and a second green LED 30e. The signal strength meter/indicator 4 of the present invention also includes an output coaxial cable 22 having a female connector 46 situated at the free end thereof so as to be coupleable to the male input connector on a television or monitor. On this coaxial cable 44 is provided the first output signal from the splitter 18 or directional coupler. As may also be seen from FIG. 5D of the drawings, the power adaptor 36 which may be plugged into an ordinary AC outlet or receptacle in the premises is connected to the signal strength meter/indicator 4 via an electrical wire 48. The bottom or back surface of the outer housing 34 of the device 4 is shown in FIG. 5E.

Figure 5F:
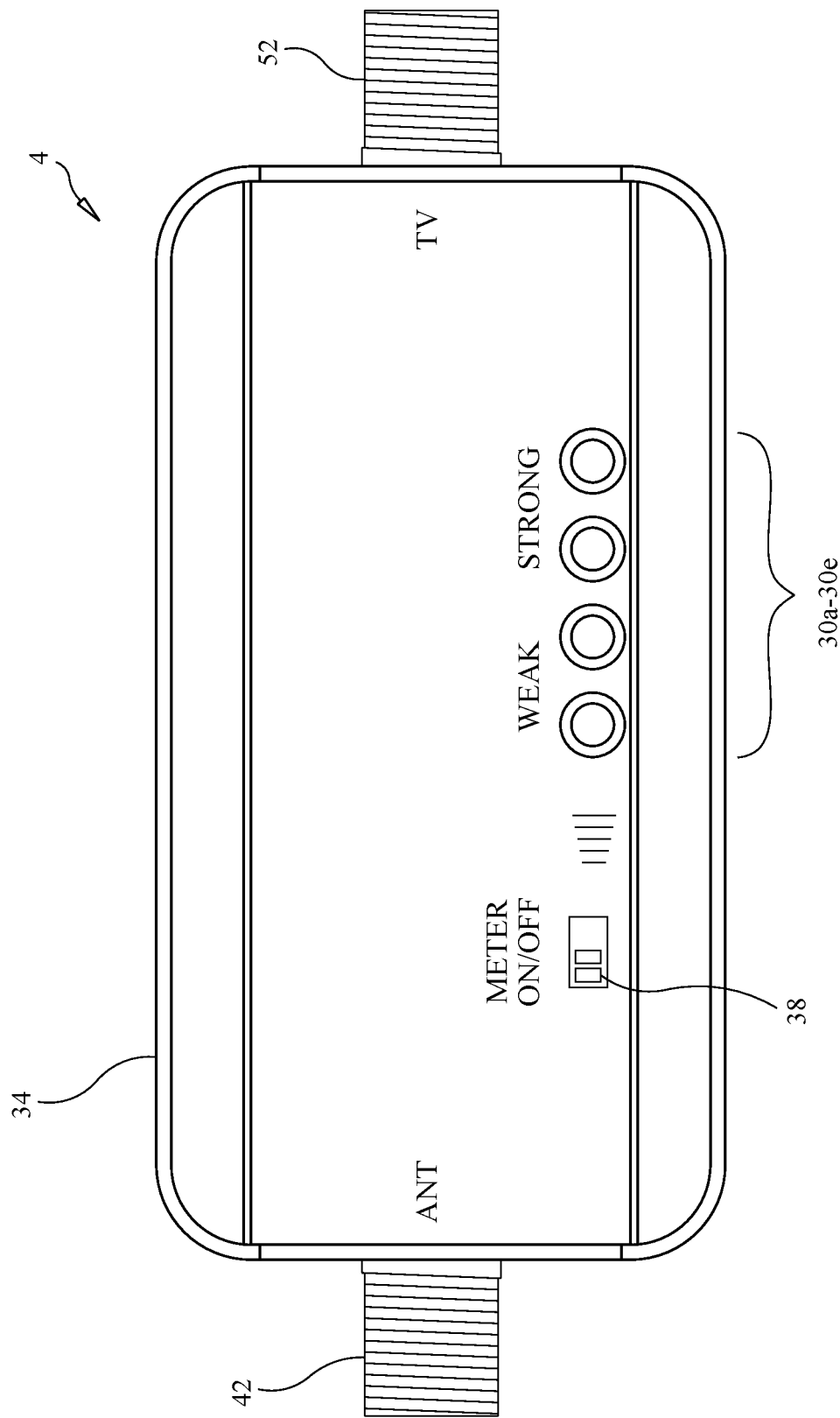
FIG. 5F is a front elevational view of another embodiment of the AGC-controlled signal strength meter/indicator formed in accordance with the present invention.

FIG. 5F shows an alternative embodiment of the AGC-controlled signal strength meter/indicator 4 of the present invention shown in FIGS. 5D and 5E. This embodiment has all of the features of the device shown in FIGS. 5D and 5E and described previously, but has not only an input coaxial connector 42 but also an output coaxial connector 52 to which may be coupled a coaxial cable, such as cable 22, that is connected to the antenna input of the television 21. This embodiment also preferably includes the output "boost" amplifier 50 mentioned previously and shown in FIG. 1 of the drawings.

Since the LED display 32 which provides an indication of the strength of the signal received by the antenna 6 is linked to the AGC circuit within the signal strength meter/indicator device 4 of the present invention, a more accurate indication of received signal strength is provided by the device 4 of the present invention. Furthermore, because the signal strength indicator is in the form of a traffic light-type LED display 32, the signal strength meter/indicator 4 of the present invention provides a more intuitive indication of received signal strength.

The signal strength meter/indicator 4 of the present invention will now be further described.

A signal strength meter/indicator 4 formed in accordance with the present invention is used with an over-the-air broadcast television signal receiving antenna 6 and measures and provides an indication of the relative signal strength of a broadcast television signal received by the receiving antenna 6. The receiving antenna 6 to which the signal strength meter/indicator 4 is connected or forms a component of has an output and provides an RF (radio frequency) output signal thereon, the output signal corresponding to the over-the-air broadcast signal received by the signal receiving antenna 6. The signal strength meter/indicator 4 includes an input bandpass filter circuit 10, the input bandpass filter circuit 10 having an output. The input bandpass filter circuit 10 is responsive to the output signal of the signal receiving antenna 6 and generates a filtered output signal on the output of the input bandpass filter circuit 10 in response to the output signal of the signal receiving antenna 6.

The signal strength meter/indicator 4 also includes a first preamplifier circuit 12, the first preamplifier circuit 12 having an output. The first preamplifier circuit 12 is responsive to the filtered output signal of the input bandpass filter circuit 10 and generates an amplified, filtered output signal on the output of the first preamplifier circuit 12 in response to the filtered output signal of the input bandpass filter circuit 10.

The signal strength meter/indicator 4 further includes a controllable variable attenuator circuit 14. The controllable variable attenuator circuit 14 has an output and at least one control signal input on which is provided at least one control signal. The controllable variable attenuator circuit 14 is responsive to the amplified, filtered output signal of the first preamplifier circuit 12 and the at least one control signal provided on the at least one control signal input and generates an adjustably attenuated output signal on the output of the controllable variable attenuator circuit 14 in response to the amplified, filtered output signal of the first preamplifier circuit 12 and the at least one control signal.

The signal strength meter/indicator 4 also includes a second preamplifier circuit 16, the second preamplifier circuit 16 having an output. The second preamplifier circuit 16 is responsive to the adjustably attenuated output signal of the controllable variable attenuator circuit 14 and generates an amplified output signal on the output of the second preamplifier circuit 16 in response to the adjustably attenuated output signal of the controllable variable attenuator circuit 14.

The signal strength meter/indicator 4 further has a splitter 18, the splitter 18 having at least a first output and a second output. The splitter 18 is responsive to the amplified output signal of the second preamplifier circuit 16 and generates a first output signal on the first output of the splitter 18 and a second output signal on the second output of the splitter 18 in response to the amplified output signal of the second preamplifier circuit 16.

The signal strength meter/indicator 4 further has an output bandpass filter circuit 20, the output bandpass filter circuit 20 having an output. The output bandpass filter circuit 20 is responsive to the first output signal of the splitter 18 and generates a filtered output signal on the output of the output bandpass filter circuit 20 in response to the first output signal of the splitter 18, the filtered output signal of the output bandpass filter circuit 20 being providable to a television signal viewing device, such as a television or a monitor 21.

The signal strength meter/indicator 4 further includes a VHF (very high frequency)/UHF (ultra high frequency) filter circuit 24, the VHF/UHF filter circuit 24 having an output. The VHF/UHF filter circuit 24 is responsive to the second output signal of the splitter 18 and generates a filtered output signal on the output of the VHF/UHF filter circuit 24 in response to the second output signal of the splitter 18.

The signal strength meter/indicator 4 also includes a power detector circuit 26, the power detector circuit 26 having an output. The power detector circuit 26 is responsive to the filtered output signal of the VHF/UHF filter circuit 24 and generates a digitized output signal on the output of the power detector circuit 26 in response to the filtered output signal of the VHF/UHF filter circuit 24, the digitized output signal corresponding to the filtered output signal of the VHF/UHF filter circuit 24.

The signal strength meter/indicator 4 further has a microcontroller 28. The microcontroller 28 has at least one control signal output and at least one indicator signal output. The microcontroller 28 is responsive to the digitized output signal of the power detector circuit 26 and generates in response to the digitized output signal of the power detector circuit 26 the at least one control signal on the at least one control signal output of the microcontroller 28 which is provided to the controllable variable attenuator circuit 14 on the at least one control signal input of the controllable variable attenuator circuit 14 and further generates in response to the digitized output signal of the power detector circuit 26 at least one indicator signal on the at least one indicator signal output.

The signal strength meter/indicator 4 also includes a display 32. The display 32 is responsive to the at least one indicator signal of the microcontroller 28 and displays an indication of the relative signal strength of the broadcast television signal received by the signal receiving antenna 6 in response to the at least one indicator signal of the microcontroller 28.

In a preferred form of the signal strength meter/indicator 4 of the present invention, the input bandpass filter circuit 10 is a digital television (DTV) bandpass filter circuit.

In yet another form of the signal strength meter/indicator 4 of the present invention, the input bandpass filter circuit 10 includes an FM (frequency modulated) trap and LTE (long term evolution) band rejection.

In another preferred form of the signal strength meter/indicator 4 of the present invention, the power detector circuit 26 includes an analog-to-digital converter circuit 33. The filtered output signal of the VHF/UHF filter circuit 24 is an analog signal and is received by the power detector circuit 26, and the digitized output signal of the power converter circuit 26 is a digital representation of the analog filtered output signal of the VHF/UHF filter circuit 24 generated by the analog-to-digital converter circuit 33. Preferably, the digitized output signal of the power detector circuit 26 is representative of a parameter of the analog filtered output signal of the VHF/UHF filter circuit 24.

Even more preferably, the controllable variable attenuator circuit 14 of the signal strength meter/indicator 4 is a PIN diode attenuator circuit.

Preferably, the microcontroller 28, the controllable variable attenuator circuit 14, the second preamplifier circuit 16, the splitter 18, the VHF/UHF filter circuit 24 and the power detector circuit 26 together define an AGC (automatic gain control) circuit which adjustably controls the power level of at least the first output signal of the splitter 18. Furthermore, the display 32 is preferably adjustably controlled by the AGC circuit in displaying the indication of the relative signal strength of the broadcast television signal received by the signal receiving antenna 6 to thereby define an AGC-controlled display 32.

In a preferred form of the signal strength meter/indicator 4 of the present invention, the AGC-controlled display 32 is a traffic light-type LED (light emitting diode) array display 35. In one form, the traffic light-type LED array display 32 is an LED segment display, or the display 32 may include a plurality of individual LED indicators spaced apart from one another.

In a preferred form of the signal strength meter/indicator 4 of the present invention, the AGC-controlled display 32 has at least three indicators, including a first indicator 30a emitting a first light indicative of a first relative signal strength of the broadcast television signal received by the signal receiving antenna 6, a second indicator 30c emitting a second light indicative of a second relative signal strength of the broadcast television signal received by the signal receiving antenna 6 and a third indicator 30e emitting a third light indicative of a third relative signal strength of the broadcast television signal received by the signal receiving antenna 6. In this regard, the first relative signal strength is less than the second relative signal strength, the second relative signal strength is less than the third relative signal strength and the third relative signal strength is greater than the first relative signal strength, the third relative signal strength also being greater than the second relative signal strength.

In one form of the signal strength meter/indicator 4 of the present invention, the first light emitted by the first indicator 30a of the AGC-controlled display 32 is in a first color, the second light emitted by the second indicator 30c of the AGC-controlled display 32 is in a second color and the third light emitted by the third indicator 30e of the AGC-controlled display 32 is in a third color, the first color being different from the second color and the third color, the second color being different from the first color and the third color, and the third color being different from the first color and the second color. Preferably, the first color of the first light emitted by the first indicator 30a of the AGC-controlled display 32 is a substantially red color, the second color of the second light emitted by the second indicator 30c of the AGC-controlled display 32 is one of a substantially orange color and a substantially yellow color, and the third color of the third light emitted by the third indicator 30e of the AGC-controlled display 32 is a substantially green color.

In yet another form of the signal strength meter/indicator 4 of the present invention, the first light emitted by the first indicator 30a of the AGC-controlled display 32 is in a first color, the second light emitted by the second indicator 30c of the AGC-controlled display 32 is in a second color and the third light emitted by the third indicator 30e of the AGC-controlled display 32 is in a third color, the first color being substantially the same as the second color and the third color, the second color being substantially the same as the first color and the third color, and the third color being substantially the same as the first color and the second color.

In a preferred form of the signal strength meter/indicator 4 of the present invention having a display 32 with at least three indicators, the first indicator 30a, the second indicator 30c and the third indicator 30e are arranged in sequence and in alignment with each other in a row, with the first indicator 30a being disposed adjacent or in proximity to the second indicator 30c, and the second indicator 30c being disposed adjacent or in proximity to the third indicator 30e.

In another form of the signal strength meter/indicator 4 of the present invention, where the AGC-controlled display 32 has at least three indicators, including a first indicator 30a emitting a first light, a second indicator 30c emitting a second light and a third indicator 30e emitting a third light, as the relative signal strength of the received broadcast television signal increases, the indicators 30a, 30c, 30e illuminate in sequence and remain lit. More specifically, the first indicator 30a of the AGC-controlled display 32 emits the first light to indicate a first relative signal strength of the broadcast television signal received by the signal receiving antenna 6. The second indicator 30c of the AGC-controlled display 32 emits the second light while the first indicator 30a is emitting the first light to indicate a second relative signal strength of the broadcast television signal received by the signal receiving antenna 6. The third indicator 30e of the AGC-controlled display 32 emits the third light while the first indicator 30a is emitting the first light and while the second indicator 30c is emitting the second light to indicate a third relative signal strength of the broadcast television signal received by the signal receiving antenna 6. In this regard, the first relative signal strength is less than the second relative signal strength, and the second relative signal strength is less than the third relative signal strength.

In an alternative form of the signal strength meter/indicator 4 of the present invention, the AGC-controlled display 32 has at least five indicators, including a first indicator 30a emitting a first light indicative of a first relative signal strength of the broadcast television signal received by the signal receiving antenna 6, a second indicator 30b emitting a second light indicative of a second relative signal strength of the broadcast television signal received by the signal receiving antenna 6, a third indicator 30c emitting a third light indicative of a third relative signal strength of the broadcast television signal received by the signal receiving antenna 6, a fourth indicator 30d emitting a fourth light indicative of a fourth relative signal strength of the broadcast television signal received by the signal receiving antenna 6, and a fifth indicator 30e emitting a fifth light indicative of a fifth relative signal strength of the broadcast television signal received by the signal receiving antenna 6. In this regard, the first relative signal strength is less than the second relative signal strength, the second relative signal strength is less than the third relative signal strength, the third relative signal strength is less than the fourth relative signal strength, and the fourth relative signal strength is less than the fifth relative signal strength.

In a further preferred form of the signal strength meter/indicator 4 of the present invention, the first light emitted by the first indicator 30a of the AGC-controlled display 32 is in a first color, the second light emitted by the second indicator 30b of the AGC-controlled display 32 is in a second color, the third light emitted by the third indicator 30c of the AGC-controlled display 32 is in a third color, the fourth light emitted by the fourth indicator 30d of the AGC-controlled display 32 is in a fourth color, and the fifth light emitted by the fifth indicator 30e of the AGC-controlled display 32 is in a fifth color, the first color being different from the second color, the third color, the fourth color and the fifth color, the second color being different from the first color, the third color, the fourth color and fifth color, the third color being different from the first color, the second color, the fourth color and the fifth color, and the fourth color being different from the first color, the second color and the third color. The fourth color of the fourth light emitted by the fourth indicator 30d of the AGC-controlled display 32 may be substantially the same color as the fifth color of the fifth light emitted by the fifth indicator 30e of the AGC-controlled display 32.

In yet another preferred form of the signal strength meter/indicator 4 of the present invention, the first color of the first light emitted by the first indicator 30a of the AGC-controlled display 32 is a substantially red color, the second color of the second light emitted by the second indicator 30*b* of the AGC-controlled display 32 is a substantially orange color, the third color of the third light emitted by the third indicator 30*c* of the AGC-controlled display 32 is a substantially yellow color, the fourth color of the fourth light emitted by the fourth indicator 30*d* of the AGC-controlled display 32 is one of a substantially green color and a color different from a substantially red color, a substantially orange color and a substantially yellow color, and the fifth color of the fifth light emitted by the fifth indicator 30*e* of the AGC-controlled display 32 is one of a substantially green color and a color that is different from a substantially red color, a substantially orange color and a substantially yellow color.

In an alternative form of the signal strength meter/indicator 4 of the present invention, the first light emitted by the first indicator 30*a* of the AGC-controlled display 32 is in a first color, the second light emitted by the second indicator 30*b* of the AGC-controlled display 32 is in a second color, the third light emitted by the third indicator 30*c* of the AGC-controlled display 32 is in a third color, the fourth light emitted by the fourth indicator 30*d* of the AGC-controlled display 32 is in a fourth color and the fifth light emitted by the fifth indicator 30*e* of the AGC-controlled display 32 is in a fifth color. In this embodiment, the first color is substantially the same as the second color, the third color, the fourth color and the fifth color; the second color is substantially the same as the first color, the third color, the fourth color and the fifth color; the third color is substantially the same as the first color, the second color, the fourth color and the fifth color; the fourth color is substantially the same as the first color, the second color, the third color and the fifth color; and the fifth color is substantially the same as the first color, the second color, the third color and the fourth color.

In a preferred form of the signal strength meter/indicator 4 of the present invention having a display 32 with at least five indicators, the first indicator 30*a*, the second indicator 30*b*, the third indicator 30*c*, the fourth indicator 30*d* and the fifth indicator 30*e* are arranged in sequence and in alignment with each other in a row, with the first indicator 30*a* being disposed adjacent or in proximity to the second indicator 30*b*, the second indicator 30*b* being disposed adjacent or in proximity to the third indicator 30*c*, the third indicator 30*c* being disposed adjacent or in proximity to the fourth indicator 30*d* and the fourth indicator 30*d* being disposed adjacent or in proximity to the fifth indicator 30*e*.

In another form of the signal strength meter/indicator 4 of the present invention, the AGC-controlled display 32 has at least five indicators, including a first indicator 30*a* emitting a first light, a second indicator 30*b* emitting a second light, a third indicator 30*c* emitting a third light, a fourth indicator 30*d* emitting a fourth light and a fifth indicator 30*e* emitting a fifth light. In this embodiment, as the relative signal strength of the received broadcast television signal increases, the indicators 30*a*, 30*b*, 30*c*, 30*d*, 30*e* illuminate in sequence and remain lit. More specifically, the first indicator 30*a* of the AGC-controlled display 32 emits the first light to indicate a first relative signal strength of the broadcast television signal received by the signal receiving antenna 6. The second indicator 30*b* of the AGC-controlled display 32 emits the second light while the first indicator 30*a* is emitting the first light to indicate a second relative signal strength of the broadcast television signal received by the signal receiving antenna 6. The third indicator 30*c* of the AGC-controlled display 32 emits the third light while the first indicator 30*a* is emitting the first light and while the second indicator 30*b* is emitting the second light to indicate a third relative signal strength of the broadcast television signal received by the signal receiving antenna 6. The fourth indicator 30*d* of the AGC-controlled display 32 emits the fourth light while the first indicator 30*a* is emitting the first light and while the second indicator 30*b* is emitting the second light and while the third indicator 30*c* is emitting the third light to indicate a fourth relative signal strength of the broadcast television signal received by the signal receiving antenna 6. The fifth indicator 30*e* of the AGC-controlled display 4 emits the fifth light while the first indicator 30*a* is emitting the first light and while the second indicator 30*b* is emitting the second light and while the third indicator 30*c* is emitting the third light and while the fourth indicator 30*d* is emitting the fourth light to indicate a fifth relative signal strength of the broadcast television signal received by the signal receiving antenna. In this regard, the first relative signal strength is less than the second relative signal strength, the second relative signal strength is less than the third relative signal strength, the third relative signal strength is less than the fourth relative signal strength, and the fourth relative signal strength is less than the fifth relative signal strength.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A signal strength meter/indicator for use with an over-the-air broadcast television signal receiving antenna and which measures and provides an indication of the relative signal strength of a broadcast television signal received by the receiving antenna, the receiving antenna having an output and providing an RF (radio frequency) output signal thereon, the output signal corresponding to the over-the-air broadcast signal received by the signal receiving antenna, the signal strength meter/indicator comprising:

an input bandpass filter circuit, the input bandpass filter circuit having an output, the input bandpass filter circuit being responsive to the output signal of the signal receiving antenna and generating a filtered output signal on the output of the input bandpass filter circuit in response to the output signal of the signal receiving antenna;

a first preamplifier circuit, the first preamplifier circuit having an output, the first preamplifier circuit being responsive to the filtered output signal of the input bandpass filter circuit and generating an amplified, filtered output signal on the output of the first preamplifier circuit in response to the filtered output signal of the input bandpass filter circuit;

a controllable variable attenuator circuit, the controllable variable attenuator circuit having an output and at least one control signal input on which is provided at least one control signal, the controllable variable attenuator circuit being responsive to the amplified, filtered output signal of the first preamplifier circuit and the at least one control signal provided on the at least one control signal input and generating an adjustably attenuated output signal on the output of the controllable variable attenuator circuit in response to the amplified, filtered output signal of the first preamplifier circuit and the at least one control signal;

a second preamplifier circuit, the second preamplifier circuit having an output, the second preamplifier circuit being responsive to the adjustably attenuated output signal of the controllable variable attenuator circuit and generating an amplified output signal on the output of the second preamplifier circuit in response to the adjustably attenuated output signal of the controllable variable attenuator circuit;

a splitter, the splitter having at least a first output and a second output, the splitter being responsive to the amplified output signal of the second preamplifier circuit and generating a first output signal on the first output of the splitter and a second output signal on the second output of the splitter in response to the amplified output signal of the second preamplifier circuit;

an output bandpass filter circuit, the output bandpass filter circuit having an output, the output bandpass filter circuit being responsive to the first output signal of the splitter and generating a filtered output signal on the output of the output bandpass filter circuit in response to the first output signal of the splitter, the filtered output signal of the output bandpass filter circuit being providable to a television signal viewing device;

a VHF (very high frequency)/UHF (ultra high frequency) filter circuit, the VHF/UHF filter circuit having an output, the VHF/UHF filter circuit being responsive to the second output signal of the splitter and generating a filtered output signal on the output of the VHF/UHF filter circuit in response to the second output signal of the splitter;

a power detector circuit, the power detector circuit having an output, the power detector circuit being responsive to the filtered output signal of the VHF/UHF filter circuit and generating a digitized output signal on the output of the power detector circuit in response to the filtered output signal of the VHF/UHF filter circuit, the digitized output signal corresponding to the filtered output signal of the VHF/UHF filter circuit;

a microcontroller, the microcontroller having at least one control signal output and at least one indicator signal output, the microcontroller being responsive to the digitized output signal of the power detector circuit and generating in response to the digitized output signal of the power detector circuit the at least one control signal on the at least one control signal output of the microcontroller which is provided to the controllable variable attenuator circuit on the at least one control signal input of the controllable variable attenuator circuit and further generating in response to the digitized output signal of the power detector circuit at least one indicator signal on the at least one indicator signal output; and a display, the display being responsive to the at least one indicator signal of the microcontroller and displaying an indication of the relative signal strength of the broadcast television signal received by the signal receiving antenna in response to the at least one indicator signal of the microcontroller.

2. A signal strength meter/indicator as defined by claim 1, wherein the input bandpass filter circuit is a digital television (DTV) bandpass filter circuit.

3. A signal strength meter/indicator as defined by claim 1, wherein the input bandpass filter circuit includes an FM (frequency modulated) trap and LTE (long term evolution) band rejection.

4. A signal strength meter/indicator as defined by claim 1, wherein the power detector circuit includes an analog-to-digital converter circuit;
  wherein the filtered output signal of the VHF/UHF filter circuit is an analog signal and is received by the power detector circuit; and
  wherein the digitized output signal of the power converter circuit is a digital representation of the analog filtered output signal of the VHF/UHF filter circuit.

5. A signal strength meter/indicator as defined by claim 4, wherein the digitized output signal of the power detector circuit is representative of a parameter of the analog filtered output signal of the VHF/UHF filter circuit.

6. A signal strength meter/indicator as defined by claim 1, wherein the controllable variable attenuator circuit is a PIN diode attenuator circuit.

7. A signal strength meter/indicator as defined by claim 1, wherein the microcontroller, the controllable variable attenuator circuit, the second preamplifier circuit, the splitter, the VHF/UHF filter circuit and the power detector circuit together define an AGC (automatic gain control) circuit which adjustably controls the power level of at least the first output signal of the splitter.

8. A signal strength meter/indicator as defined by claim 7, wherein the display is adjustably controlled by the AGC circuit in displaying the indication of the relative signal strength of the broadcast television signal received by the signal receiving antenna to thereby define an AGC-controlled display.

9. A signal strength meter/indicator as defined by claim 8, wherein the AGC-controlled display is a traffic light-type LED (light emitting diode) array display.

10. A signal strength meter/indicator as defined by claim 9, wherein the traffic light-type LED array display includes a plurality of individual LED indicators spaced apart from one another.

11. A signal strength meter/indicator as defined by claim 9, wherein the AGC-controlled display has at least three indicators, including a first indicator emitting a first light indicative of a first relative signal strength of the broadcast television signal received by the signal receiving antenna, a second indicator emitting a second light indicative of a second relative signal strength of the broadcast television signal received by the signal receiving antenna and a third indicator emitting a third light indicative of a third relative signal strength of the broadcast television signal received by the signal receiving antenna, the first relative signal strength being less than the second relative signal strength, the second relative signal strength being less than the third relative signal strength, the third relative signal strength being greater than the first relative signal strength, the third relative signal strength being greater than the second relative signal strength.

12. A signal strength meter/indicator as defined by claim 11, wherein the first light emitted by the first indicator of the AGC-controlled display is in a first color, the second light emitted by the second indicator of the AGC-controlled display is in a second color and the third light emitted by the third indicator of the AGC-controlled display is in a third color, the first color being different from the second color and the third color, the second color being different from the first color and the third color, and the third color being different from the first color and the second color.

13. A signal strength meter/indicator as defined by claim 12, wherein the first color of the first light emitted by the first indicator of the AGC-controlled display is a substantially red color;

wherein the second color of the second light emitted by the second indicator of the AGC-controlled display is one of a substantially orange color and a substantially yellow color; and wherein the third color of the third light emitted by the third indicator of the AGC-controlled display is a substantially green color.

14. A signal strength meter/indicator as defined by claim 11, wherein the first light emitted by the first indicator of the AGC-controlled display is in a first color, the second light emitted by the second indicator of the AGC-controlled display is in a second color and the third light emitted by the third indicator of the AGC-controlled display is in a third color, the first color being substantially the same as the second color and the third color, the second color being substantially the same as the first color and the third color, and the third color being substantially the same as the first color and the second color.

15. A signal strength meter/indicator as defined by claim 11, wherein the first indicator, the second indicator and the third indicator are arranged in sequence and in alignment with each other in a row, with the first indicator being disposed adjacent to the second indicator, the second indicator being disposed adjacent to the third indicator and the third indicator being disposed adjacent to the fourth indicator.

16. A signal strength meter/indicator as defined by claim 9, wherein the AGC-controlled display has at least three indicators, including a first indicator emitting a first light, a second indicator emitting a second light and a third indicator emitting a third light;

wherein the first indicator of the AGC-controlled display emits the first light to indicate a first relative signal strength of the broadcast television signal received by the signal receiving antenna;

wherein the second indicator of the AGC-controlled display emits the second light while the first indicator is emitting the first light to indicate a second relative signal strength of the broadcast television signal received by the signal receiving antenna; and wherein the third indicator of the AGC-controlled display emits the third light while the first indicator is emitting the first light and while the second indicator is emitting the second light to indicate a third relative signal strength of the broadcast television signal received by the signal receiving antenna, the first relative signal strength being less than the second relative signal strength, the second relative signal strength being less than the third relative signal strength.

17. A signal strength meter/indicator as defined by claim 9, wherein the AGC-controlled display has at least five indicators, including a first indicator emitting a first light indicative of a first relative signal strength of the broadcast television signal received by the signal receiving antenna, a second indicator emitting a second light indicative of a second relative signal strength of the broadcast television signal received by the signal receiving antenna, a third indicator emitting a third light indicative of a third relative signal strength of the broadcast television signal received by the signal receiving antenna, a fourth indicator emitting a fourth light indicative of a fourth relative signal strength of the broadcast television signal received by the signal receiving antenna and a fifth indicator emitting a fifth light indicative of a fifth relative signal strength of the broadcast television signal received by the signal receiving antenna, the first relative signal strength being less than the second relative signal strength, the second relative signal strength being less than the third relative signal strength, the third relative signal strength being less than the fourth relative signal strength, the fourth relative signal strength being less than the fifth relative signal strength.

18. A signal strength meter/indicator as defined by claim 17, wherein the first light emitted by the first indicator of the AGC-controlled display is in a first color, the second light emitted by the second indicator of the AGC-controlled display is in a second color, the third light emitted by the third indicator of the AGC-controlled display is in a third color, the fourth light emitted by the fourth indicator of the AGC-controlled display is in a fourth color and the fifth light emitted by the fifth indicator of the AGC-controlled display is in a fifth color, the first color being different from the second color, the third color, the fourth color and the fifth color, the second color being different from the first color, the third color, the fourth color and fifth color, the third color being different from the first color, the second color, the fourth color and the fifth color, the fourth color being different from the first color, the second color and the third color.

19. A signal strength meter/indicator as defined by claim 18, wherein the fourth color of the fourth light emitted by the fourth indicator of the AGC-controlled display is substantially the same color as the fifth color of the fifth light emitted by the fifth indicator of the AGC-controlled display.

20. A signal strength meter/indicator as defined by claim 18, wherein the first color of the first light emitted by the first indicator of the AGC-controlled display is a substantially red color;

wherein the second color of the second light emitted by the second indicator of the AGC-controlled display is a substantially orange color;

wherein the third color of the third light emitted by the third indicator of the AGC-controlled display is a substantially yellow color;

wherein the fourth color of the fourth light emitted by the fourth indicator of the AGC-controlled display is one of a substantially green color and a color different from a substantially red color, a substantially orange color and a substantially yellow color; and wherein the fifth color of the fifth light emitted by the fifth indicator of the AGC-controlled display is one of a substantially green color and a color that is different from a substantially red color, a substantially orange color and a substantially yellow color.

21. A signal strength meter/indicator as defined by claim 17, wherein the first light emitted by the first indicator of the AGC-controlled display is in a first color, the second light emitted by the second indicator of the AGC-controlled display is in a second color, the third light emitted by the third indicator of the AGC-controlled display is in a third color, the fourth light emitted by the fourth indicator of the AGC-controlled display is in a fourth color and the fifth light emitted by the fifth indicator of the AGC-controlled display is in a fifth color, the first color being substantially the same as the second color, the third color, the fourth color and the fifth color, the second color being substantially the same as the first color, the third color, the fourth color and the fifth color, the third color being substantially the same as the first color, the second color, the fourth color and the fifth color, the fourth color being substantially the same as the first color, the second color, the third color and the fifth color, the fifth color being substantially the same as the first color, the second color, the third color and the fourth color.

22. A signal strength meter/indicator as defined by claim 17, wherein the first indicator, the second indicator, the third indicator, the fourth indicator and the fifth indicator are arranged in sequence and in alignment with each other in a row, with the first indicator being disposed adjacent to the second indicator, the second indicator being disposed adjacent to the third indicator, the third indicator being disposed adjacent to the fourth indicator and the fourth indicator being disposed adjacent to the fifth indicator.

23. A signal strength meter/indicator as defined by claim 9, wherein the AGC-controlled display has at least five indicators, including a first indicator emitting a first light, a second indicator emitting a second light, a third indicator emitting a third light, a fourth indicator emitting a fourth light and a fifth indicator emitting a fifth light;

wherein the first indicator of the AGC-controlled display emits the first light to indicate a first relative signal strength of the broadcast television signal received by the signal receiving antenna;

wherein the second indicator of the AGC-controlled display emits the second light while the first indicator is emitting the first light to indicate a second relative signal strength of the broadcast television signal received by the signal receiving antenna;

wherein the third indicator of the AGC-controlled display emits the third light while the first indicator is emitting the first light and while the second indicator is emitting the second light to indicate a third relative signal strength of the broadcast television signal received by the signal receiving antenna;

wherein the fourth indicator of the AGC-controlled display emits the fourth light while the first indicator is emitting the first light and while the second indicator is emitting the second light and while the third indicator is emitting the third light to indicate a fourth relative signal strength of the broadcast television signal received by the signal receiving antenna; and wherein the fifth indicator of the AGC-controlled display emits the fifth light while the first indicator is emitting the first light and while the second indicator is emitting the second light and while the third indicator is emitting the third light and while the fourth indicator is emitting the fourth light to indicate a fifth relative signal strength of the broadcast television signal received by the signal receiving antenna, the first relative signal strength being less than the second relative signal strength, the second relative signal strength being less than the third relative signal strength, the third relative signal strength being less than the fourth relative signal strength, and the fourth relative signal strength being less than the fifth relative signal strength.

\* \* \* \* \*